United States Patent [19]
Fox

[11] 3,979,173
[45] Sept. 7, 1976

[54] RECEIVER AND TRANSFER DEVICE FOR TRANSFERRING DOUGH FROM A SUPPLY SOURCE TO A RECEIVING STATION

[75] Inventor: Raymond Fox, Leeds, England
[73] Assignee: Oddy Limited, Leeds, England
[22] Filed: Jan. 22, 1975
[21] Appl. No.: 543,055

[30] Foreign Application Priority Data
Jan. 22, 1974  United Kingdom............... 2980/74

[52] U.S. Cl................. 425/238; 425/455 R; 214/1 GD; 425/324 R
[51] Int. Cl.²........................................... A21C 5/00
[58] Field of Search........... 198/34; 214/1 GD, 6 A; 425/238–241, 324 R, 455 R

[56] References Cited
UNITED STATES PATENTS

| | | | |
|---|---|---|---|
| 1,418,003 | 5/1922 | Ladd | 214/6 A |
| 2,007,686 | 7/1935 | Marasso | 425/238 |
| 3,427,910 | 2/1969 | Zempel | 425/455 X |
| 3,446,161 | 5/1969 | Oddy | 425/241 |
| 3,599,579 | 8/1971 | Paaskesen | 425/455 X |

Primary Examiner—Francis S. Husar
Assistant Examiner—David S. Safran
Attorney, Agent, or Firm—Haseltine, Lake & Waters

[57] ABSTRACT

A receiver and transfer device mainly intended for use in a dough treatment apparatus for receiving divided pieces of dough from a dough divider, and transferring such dough pieces to a discharge location, preferably a moulding drum. The device comprises catcher members pivotally mounted on a shaft for movement between a receiver position and a discharge position, the catcher members also being displaceable parallel to the axis of the shaft between first and second axial positions. The catcher members occupy the first axial position when they receive the dough pieces from the divider, and undergo axial separation to the second axial position, by operation of a ram and parallelogram linkage, before operation of a further ram takes place to effect partial movement of the catcher members to the discharge position.

9 Claims, 8 Drawing Figures

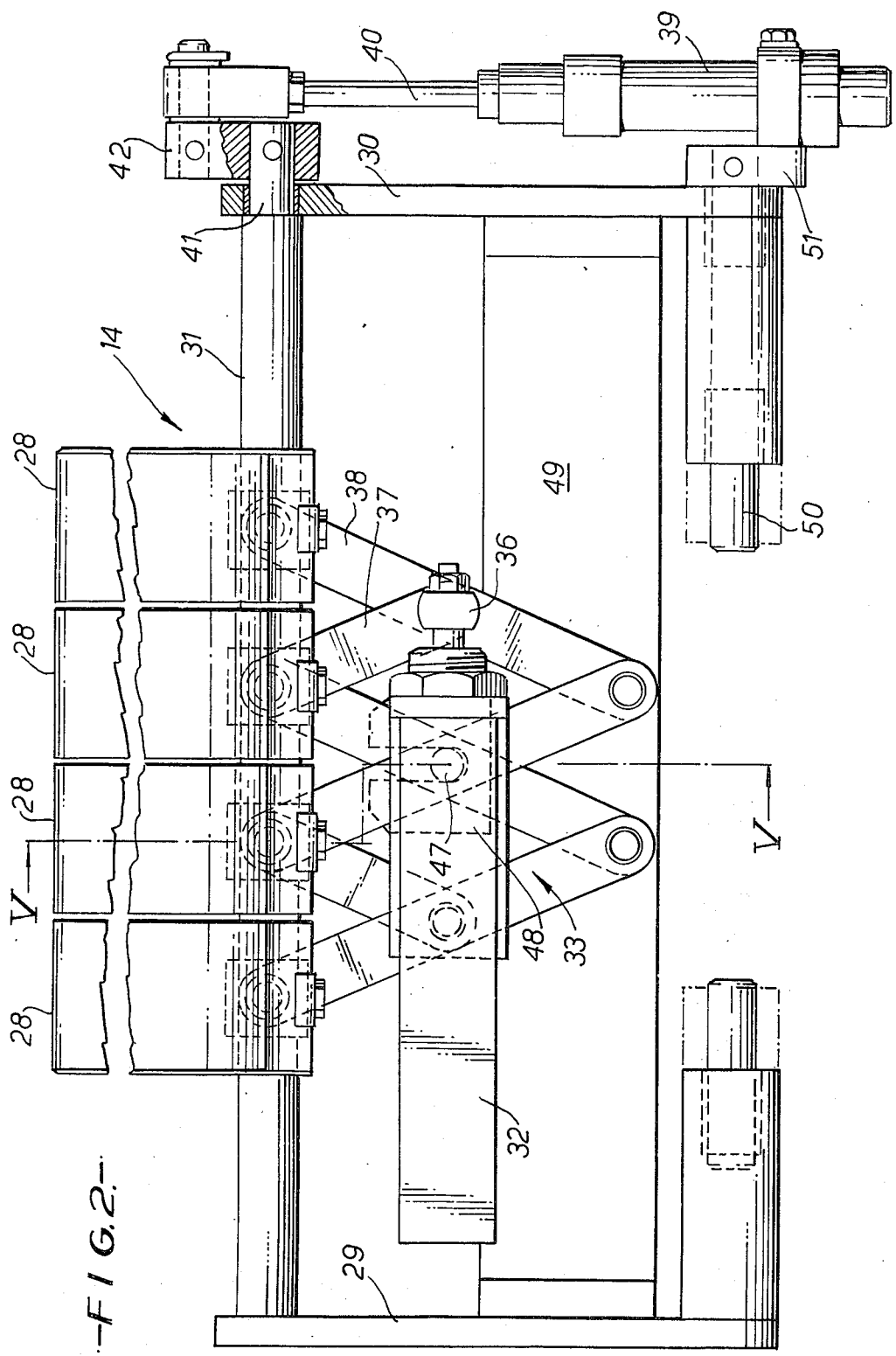

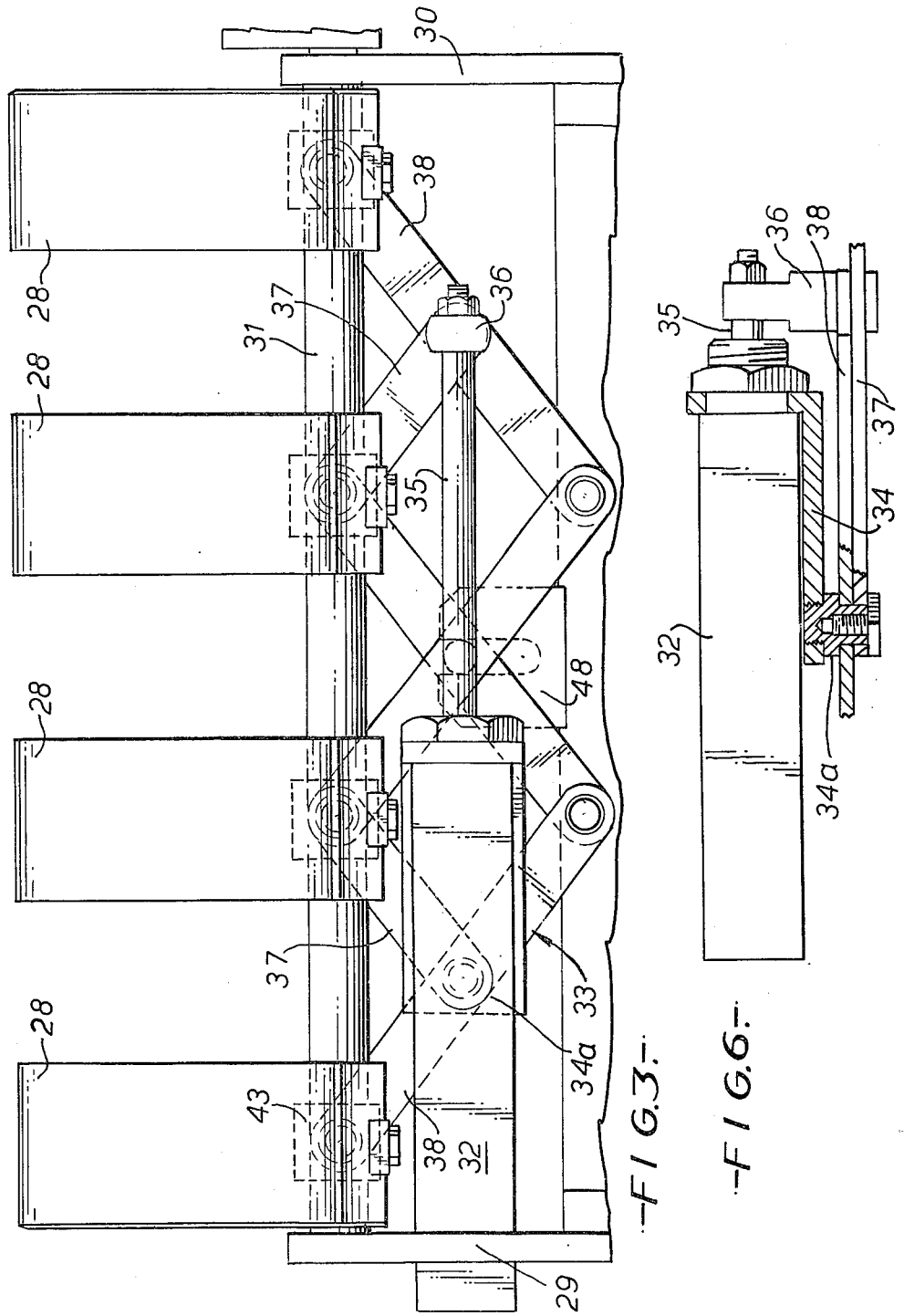

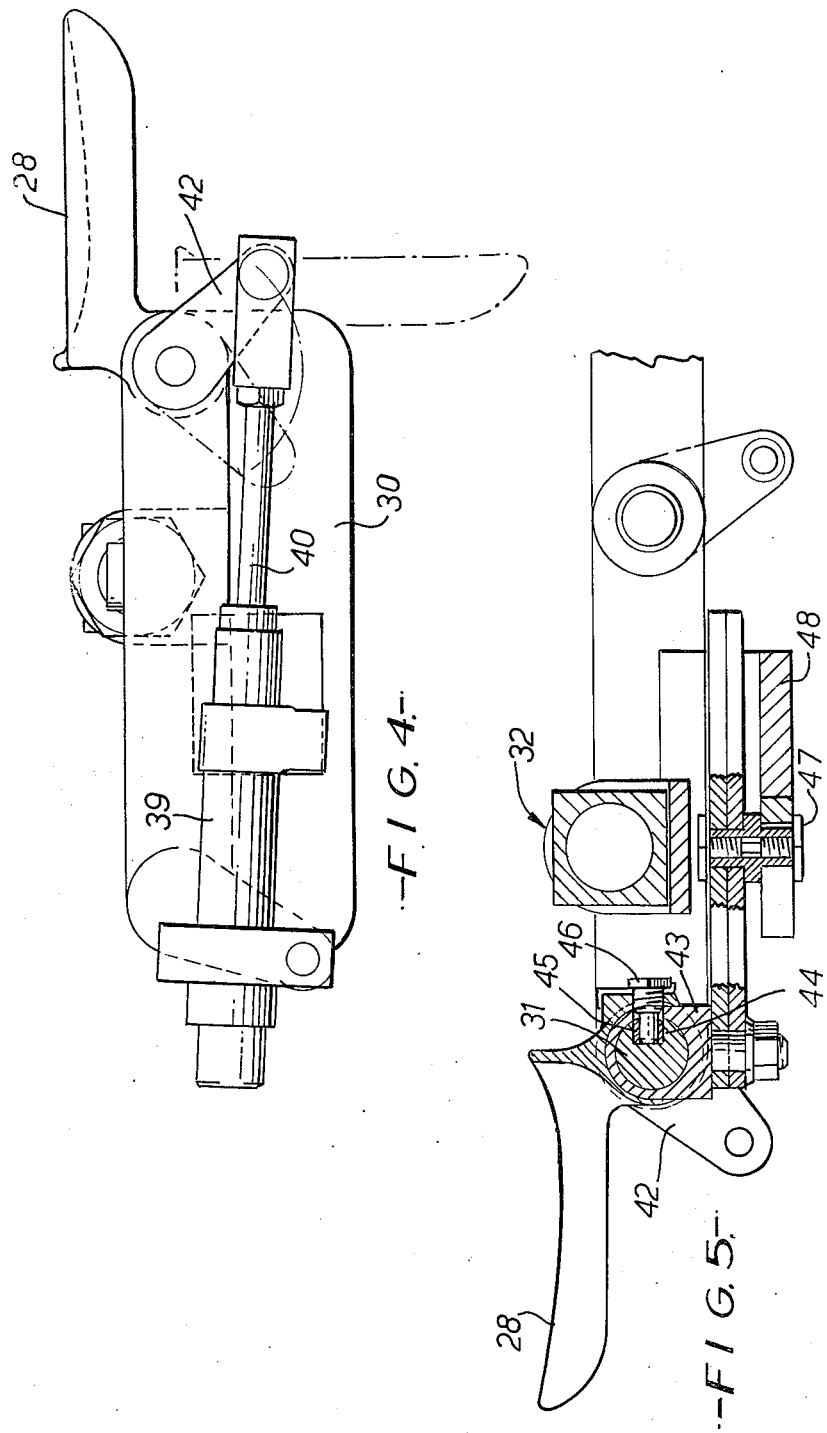

RECEIVER AND TRANSFER DEVICE FOR TRANSFERRING DOUGH FROM A SUPPLY SOURCE TO A RECEIVING STATION

FIELD OF THE INVENTION

This invention relates to a receiver and transfer device especially (but not exclusively) intended for use in a dough treatment apparatus having an inlet for the supply of dough to a dough divider, and an outlet for the discharge of divided pieces of dough from the dough divider; said receiver and transfer device being intended to receive the divided pieces of dough from said outlet, and to transfer the pieces to a discharge location, and comprising a plurality of dough piece catcher members mounted for pivotal movement about an axis between a receiver position and a discharge position, and being displaceable parallel to said axis between first and second positions to vary the axial spacing between individual catcher members.

In this specification, the term "dough" is employed and it is to be understood that this is intended to include all forms of dough or paste employed in the manufacture of all types of bread, rolls and like products. Furthermore it is to be understood that the device according to the invention may be employed in other environments to provide for the receipt and transfer of dough or paste-like material from one processing station to a further processing station.

One known dough treatment apparatus is shown in U.K. Patent specification No. 1,132,145 which provides a receiver and transfer device which is located in the apparatus between an outlet through which divided pieces of dough fall, and a moulding drum to which the pieces of dough are transferred by the device. The receiver and transfer device has a number of catcher members or fingers which are axially moveable between a first position in which they are closely spaced from each other in order to receive pieces of dough from a dough divider, and a second spaced-apart position which corresponds to the axial spacing between pockets provided in the periphery of the moulding drum. In order to transfer the pieces of dough to the moulding drum, the catcher members carry out pivotal movement between a receiver position in which moulded pieces of dough are received from the dough divider and a transfer position in which the pieces of dough can fall into respective pockets in the periphery of the moulding drum. The arrangement is such that axial separation of the catcher members takes place simultaneously with movement of the catcher members between the receiver and discharge positions.

Although this known apparatus can operate satisfactorily under certain conditions, problems can arise due to uneven discharge of the pieces of dough, since there may be a tendency for some pieces of dough to fall off their respective catcher members in advance of other pieces so that it cannot be guaranteed that all the pieces will be received in their respective pockets provided in the moulding drum. This problem occurs due to the manner in which the catcher members carry out, simultaneously, both of their operating conditions i.e. axial separation to bring the pieces into axial register with the pockets in the moulding drum, and pivotal movement between the receiver and discharge positions so that the pieces of dough can fall into the pockets in the moulding drum.

Furthermore, with the known apparatus, problems can also arise in the handling of dough pieces when the weight of the dough pieces is varied.

Further, in the known apparatus, the catcher members move continuously about an axis between the receiver and discharge positions so that a stationary receiver position for the divided pieces of dough is not possible. This also can give problems in efficient handling of the dough pieces.

SUMMARY OF THE INVENTION

According to one aspect of the invention there is provided a receiver and transfer device comprising; a plurality of catcher members mounted for pivotal movement about an axis between a receiver position and a discharge position, said catcher members, also being displaceable parallel to said axis between first and second positions to vary the axial spacing between individual catcher member; first drive means coupled with said catcher members to effect axial displacement of said catcher members between said first and second positions, and second drive means coupled with said catcher members to effect pivotal movement of the catcher members from said receiver position to said discharge position only after substantial completion of displacement of the catcher members by said first drive means from said first position to said second position.

According to a further aspect the invention provides a dough treatment apparatus having a dough divider; an inlet for the supply of dough to said divider; an outlet for the discharge of divided pieces of dough from said dough divider; and a receiver and transfer device arranged to receive the divided pieces of dough from said outlet, and to transfer the pieces to a discharge location; said receiver and transfer device comprising a plurality of catcher members mounted for pivotal movement about an axis between a receiver position and a discharge position, and being displaceable parallel to said axis between first and second positions, said catcher members being positioned to receive divided pieces of dough from said outlet when said catcher members occupy said receiver position and said first axial position, and being positioned to discharge divided pieces of dough at the discharge location when the catcher members occupy said discharge position and said second axial position; first drive means coupled with said catcher members to effect axial displacement of said catcher members between said first and second positions, and second drive means coupled with said catcher members to effect pivotal movement of the catcher members from said receiver position to said discharge position only after substantial completion of displacement of the catcher members by said first drive means from said first position to said second position.

Thus, by ensuring that the catcher members are not pivotted to a discharge position until such time as axial separation has been completed, very efficient discharge of dough pieces can be obtained in a regular and controlled manner. Further, the receiver and transfer device according to the invention can provide a stationary receiving position for the catcher members to receive the moulded pieces from the dough divider, and this facilitates proper location of the pieces on the catcher members which, as mentioned above, cannot be guaranteed with the known apparatus in which the catcher members are continuously rotated from the receiver position to the discharge position.

Preferably, the receiver and transfer device according to the invention is coupled with a dough divider of the dough treatment apparatus (and is not independent of it as in the known apparatus) and therefore is located in a more efficient position for receiving the dough pieces when they are discharged from the dough divider or so called measuring pocket.

A further advantage of dough treatment apparatus incorporating the receiver and transfer device according to the invention is that the apparatus can be timed and adjusted to cope with different types of dough and different weights of dough. Control means is provided for controlling both the time at which the receiving fingers or catcher members open, and also the time at which the receiving fingers deposit the dough pieces into a moulding drum.

BRIEF DESCRIPTION OF THE DRAWING

FIG. 2 is a plan view of the receiver and transfer device showing dough catcher members in a first axial position;

FIG. 3 is a fragmentary plan view showing the dough catcher members in a second, axial position;

FIG. 4 is a side view of the device, showing a drive means for pivoting the catcher members;

FIG. 5 is a sectional view taken on the line V—V in FIG. 2;

FIG. 6 is a side view of drive means for moving the catcher members axially;

Figure 1:
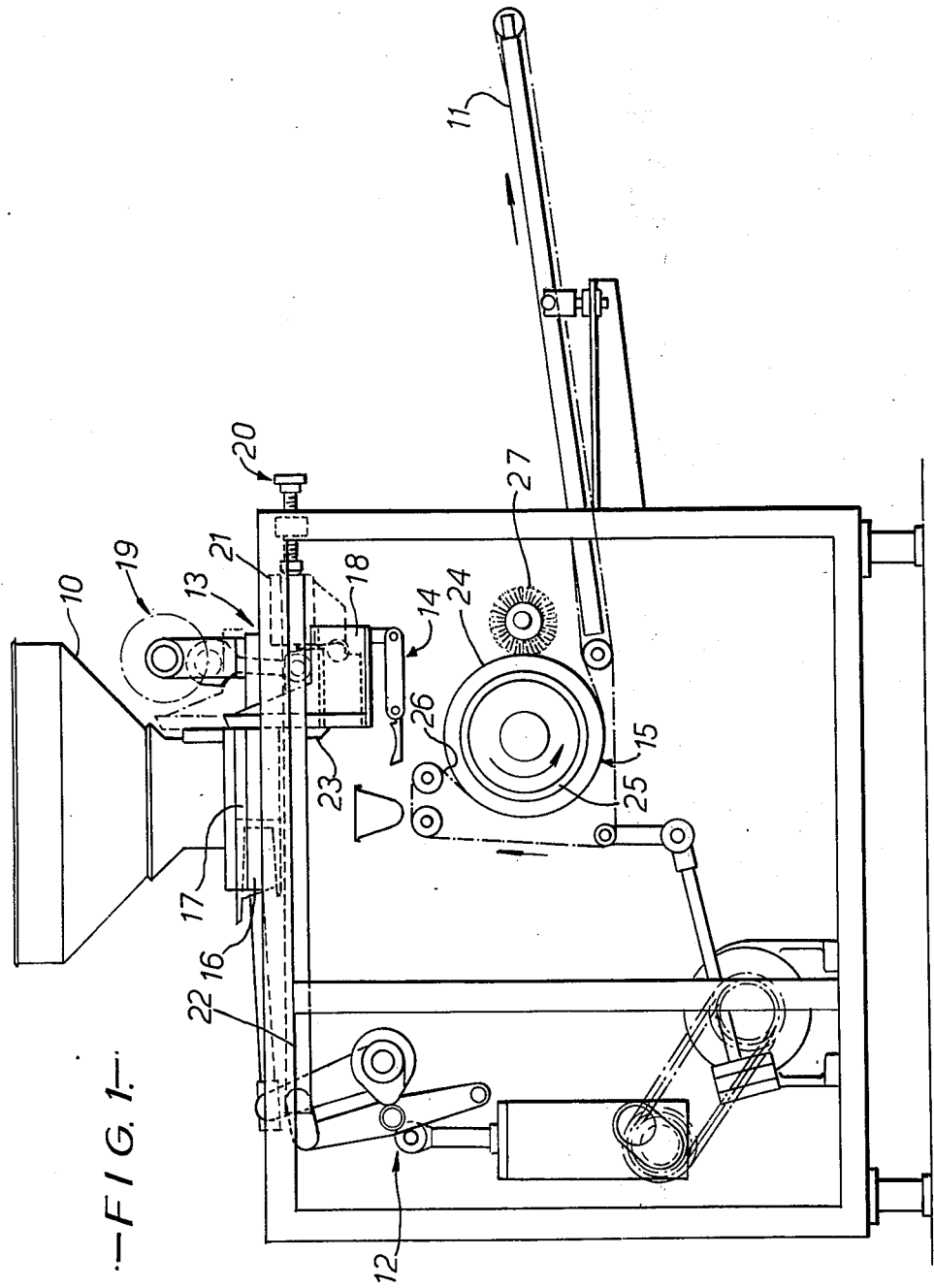
FIG. 1 is a side elevational view of a dough treatment apparatus incorporating a receiver and transfer device according to the invention.

Referring first of all to FIG. 1 of the drawings, there is illustrated a dough treatment apparatus which is intended to process automatically dough or paste like products. The apparatus stores the dough in a hopper 10 and, after processing by the apparatus, balls or blocks (pieces) of compressed dough are discharged by a conveyor arrangement 11 so as to fall on a standard baking tray e.g. an 18 inch tray with balls of dough spaced at 4 inch centres. This then provides adequate space for expansion of the product during subsequent baking or other operations.

The apparatus illustrated in FIG. 1 comprises a number of working parts which are arranged to be driven in synchronism with each other for the automatic processing of dough fed from the hopper 10, the main working parts comprising a bell crank driven ram arrangement 12 including a pressure limiting unit, a dough divider 13, a receiving and transfer device 14, a moulding drum arrangement 15 and the endless conveyor arrangement 11.

The arrangement 12 includes a reciprocable main plunger 16 which is arranged, during a compression stroke, to press dough under pressure into mould cavities provided in the divider 13. During a retraction stroke of the plunger 16, a charge of dough passes from the hopper 10 partly under gravity and partly by suction effect into a main pocket or inlet 17, and during the compression stroke the charge of dough is compressed so that at least the majority of the air present in the mixture is expelled and mould cavities in a back pocket mould 18 are filled when the back pocket occupies an upper position (shown in dashed lines) in line with main pocket 17. Any desired number of mould cavities may be provided, preferably arranged at 2 inch centres. Purely by way of example, the present arrangement provides four mould cavities so that four separate amounts of dough are formed during each working stroke of the plunger 16.

The back pocket 18 is vertically moveable by a crank arrangement 19 and is shown in FIG. 1 in its bottom position. In its upper position, the pocket is arranged to receive dough under pressure from the main pocket 17 whereupon longitudinally moveable plungers (not shown) in the mould cavities are moved rearwardly (to the right) until they abut against a weight adjustment device 20 which controls the length of the pieces.

The mould arrangement 13, as mentioned above, has four mould cavities and is arranged to be moved downwardly (in conjunction with the device 14 coupled therewith), when the mould cavities have been filled with dough under pressure, to a discharge position at which the moulded dough pieces are discharged onto the receiving and transfer device 14. A discharge shoe 21 is operated by a rod 22 controlled by a cam-lever arrangement of drive 12 to effect displacement of the plungers in the mould cavities thereby to eject the pieces or product from the mould cavities whereby each piece should normally fall onto a respective catcher portion of the device 14. If, for any reason, product should remain partly attached to the mould arrangement, during upward return movement of the mould cavity to the initial position ready to receive a further charge of dough, a knife 23 effects separation of such adhering product. The construction and operation of the receiving and transfer device 14 will be described in more detail below with reference to the further Figures.

The moulding drum 15 comprises an outer rotatable shell 24 which is provided with circumferentially spaced rows of axially extending pockets (not shown) extending through the wall of the shell and arranged to receive product transferred by the device 14. With the present arrangement provided with four mould cavities, there will be correspondingly four axially spaced pockets provided in each row of pockets in the periphery of the shell 24. However, as will be described in more detail below, the four products received by the device 14 are initially at a spacing corresponding to the spacing of the mould cavities e.g. 2 inch centres, but after operation of the device 14, the products are spaced further apart from each other e.g. at 4 inch centres and the axially spaced pockets in each row in the shell 24 are so arranged as to receive the spaced apart product from the device 14.

The moulding drum 15 further includes an inner vibratory cylinder 25 and an endless belt arrangement 26 which together co-operate so as to effect a moulding action on the product in each pocket in the shell 24 in known manner. The product is rolled up into ball-like shape and is discharged from the moulding drum 15 to pass onto the conveyor arrangement 11 in rows of spaced product which is subsequently transported to a discharge station (not station) at which the product falls onto a receptacle for transfer to further processing stations, preferably falling onto a standard 18 inch baking tray. In order to remove any material which may be attached to the moulding roller 15 after discharge of products, a rotary brush 27 is provided.

The receiving and transfer device 14 will now be described in more detail with reference to FIGS. 2 to 6 of the drawings. Referring first to FIGS. 2, there is shown a plan view of the device 14 which comprises a plurality of catcher members 28 corresponding in number to the number of products moulded at each time in the moulding arrangement 13. Thus, in the present arrangement, four catcher members 28 are provided and they are shown in FIG. 2 in a first position, closely adjacent, suitable for receiving individual product from the mould arrangement 13. The device 14 has a frame including end plates 29 and 30 which mount rotatably a shaft 31 on which the catcher members 28 are mounted. The nature of the mounting of the catcher members 28 on the shaft 31 will be described in more detail below with reference to FIG. 5, but it will be mentioned now that the catcher members 28 are displaceable axially of the shaft 31, but are so connected therewith that they are rotatable with the shaft 31 upon rotation thereof.

In order to effect displacement of the catcher members 28 axially of the shaft 31, a first drive means 32 is provided which preferably takes the form of a pneumatic ram (though hydraulic or other driving arrangements could be provided) and which is connected to the catcher members 28 by a parallelogram linkage 33. The arrangement is such that, upon unit displacement of the ram 32, axial separation of the catcher members 28 is effected by two units of distance. In FIG. 3, the second axial positions of the catcher members 28 are shown and it will be appreciated that operation of the ram 32 will cause an increase in the axial spacing between individual products carried by the catcher members 28 e.g. from 2 inch centres to 4 inch centres, which then renders the products spaced apart at suitable distances for subsequent discharge by the device 14 into the pockets provided in the moulding drum 15.

As shown in FIG. 6, the ram 32 has its cylinder coupled fast with a bracket 34 and the piston rod 35 of the ram 32 is coupled fast with a peg 36, the bracket 34 and peg 36 being coupled with the links of the parallelogram linkage 27 (short links 37 and long links 38). The peg 36 is connected pivotally to short and long links 37 and 38 provided at the right hand end of the linkage as shown in FIG. 2, whereas the bracket 34 has a pivotal connection 34a to the short and long links 37 and 38 at the left hand end of the linkage.

Referrin now to FIG. 4 of the drawings, there is shown a drive arrangement (second drive means) provided on the end plate 30 of the frame of the device and intended to effect pivotting of the shaft 31. The drive arrangement comprises a pneumatic cylinder or ram 39 which has its piston rod 40 coupled with a stub shaft 41 of the shaft 31 by means of a crank arm 42. The ram 39 is so mounted on the end plate 30 as to be capable, during reciprocation of the piston rod 40, to effect pivotting of the shaft 31 (and therefore also the catcher members 28) through 90° between the horizontal position shown in the drawings and a vertically downward position (not shown) suitable for discharge of the products from the catcher members 28. However, a control mechanism is provided whereby the ram 39 is not operated until axial separation of the catcher members by the ram 39 has been completed. Conveniently, the control mechanism comprises a cam shaft driven in synchronism with the drive for the other working parts of the dough treatment apparatus, the cams being arranged to trip air valves at predetermined intervals to operate the rams 32 and 39 accordingly. However, it will be appreciated that other forms of control means may readily be provided.

Turning now to FIG. 5 of the drawings, there is shown in more detail the nature of the connection between the catcher members 28 and the shaft 31. Each catcher member 28 is provided with a pivot bolt 43 coupled fast therewith and which is slidable on the shaft 31. A longitudinal keyway 44 is formed in the shaft 31 and each pivot bolt 43 is provided with a slipper 45 and key 46 movable in keyway 44 whereby the pivot bolt 43 can be displaced axially relative to the shaft 31, but is coupled with the shaft for rotation therewith. Also, each pivot bolt 43 is pivotally connected to one or more of the links of the parallelogram linkage as shown in FIGS. 2 and 3 whereby the catcher members 28 can be displaced axially relative to the shaft 31 upon reciprocation of the ram 32. Furthermore, the operating mechanism comprising ram 32 and parallelogram linkage 33 is mounted centrally positioned in the frame of the device by a centre link pivot 47 (FIG. 5) moving in a guide block 48 mounted on a cross beam 49 (FIG. 2).

Figure 7:
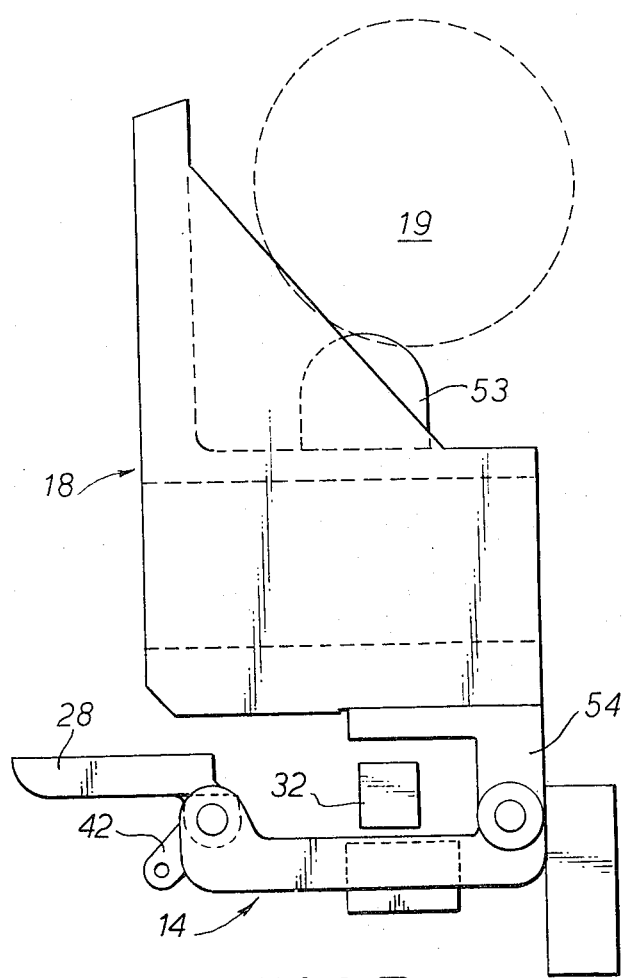
FIG. 7 is a side view, to an enlarged scale, of the receiver and transfer device coupled with part of a dough divider arrangement.
Figure 8:
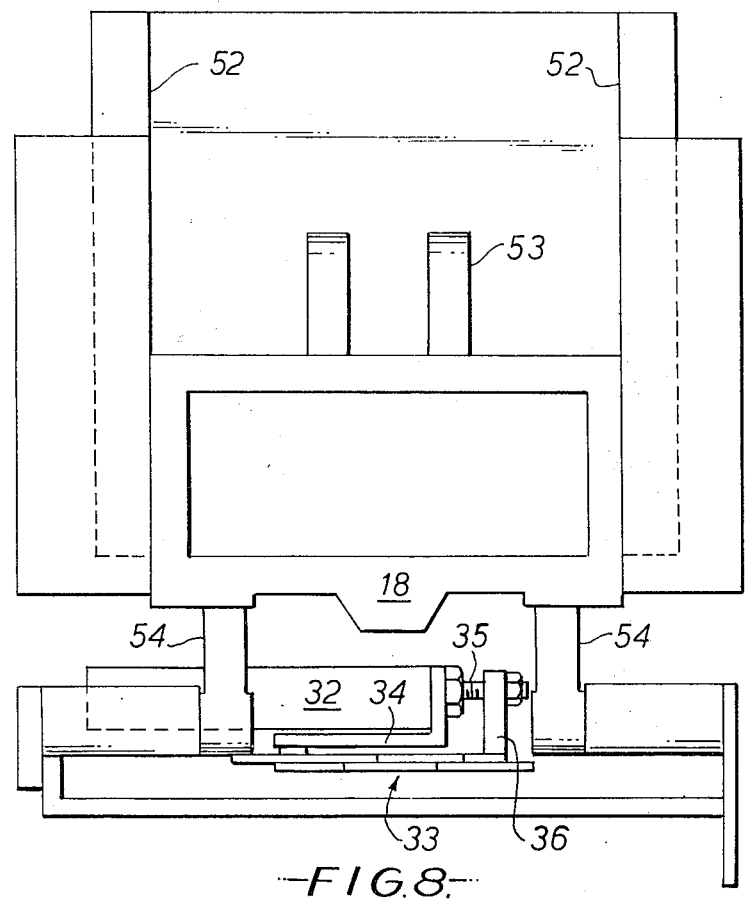
FIG. 8 is an end view corresponding to FIG. 7.

FIGS. 7 and 8 show, in more detail and to an enlarged scale, the attachment of the receiver and transfer device 14 to part of the dough divider arrangement (upwardly and downwardly moveable back pocket mould 18).

In order to displace the back pocket 18 vertically in appropriate timed sequence within a guide 52, the crank arrangement 19 is coupled with upstanding lugs 53 of the pocket 18. Since the device 14 is coupled fast with pocket 18 by arms 54 extending downwardly of pocket 18, the device 14 follows the movement of pocket 18.

The ram 32 and its coupling with the catcher members 28 by linkage 33 is shown only schematically device may be adapted to operate in such a manner that the frame of the device is pivotable and 8, the integers being described in more detail above. Also, the ram 39 and its coupling with the catcher member 28 have been omitted from FIGS. 7 and 8 for clarity.

A normal operating sequence for the receiving and transfer device 14 will now be described. Initially, the catcher members 28 will be spaced close together as shown in FIG. 2 and extending substantially horizontally with the ram 39 fully extended. Upon discharge of products from the moulding arrangement 13 onto the catcher member 28 (one to each catcher member), the control means effects energisation of the ram 32 which operates through the parallelogram linkage 33 so as to move the catcher members 28 axially of the shaft 31 thereby to increase the spacing between the individual products. When the desired separation has been reached, further energisation of the ram 32 is terminated and the control means now is operated to retract the piston rod 40 of the ram 39 whereby the shaft 31 and the catcher members 28 coupled therewith pivot through 90° to a vertically downward position from which the products are readily discharged from the device to be received in respective axially spaced pockets provided in the moulding shell 15. The ram 39 is then again extended to return the catcher members 28 to the initial, horizontal position and the ram 32 is then retracted so as to return the catcher members 28 to the closely spaced position ready to receive, in timed sequence further products from the molding arrangement. By ensuring that the catcher members 28 are not pivotted to a discharge position until such time as the axial separation has been completed, or substantially completed, very efficient discharge of products from the device in a regular and controlled manner can be obtained. This contrasts with the known arrangement in which separation of the catcher members for the products is carried out simultaneously with rotation of the catcher members from a receiving position to a discharge position which can give rise to uneven discharge of the products i.e. some products falling-off their respective catcher members in advance of other products so that it cannot be guaranteed that the products will be received in their respective pockets provided in the moulding roller. Particularly, problems can arise with the prior arrangement when the weight of the product is varied. Moreover, the present arrangement described and illustrated herein is advantageous in providing a stationary receiving position for the catcher members to receive the product from the moulding arrangement as this facilitates proper location of the products on the catcher members which cannot always be guaranteed with the known arrangement in which the catcher members are continuously rotated from a receiving position to a discharge position, or at least are being continuously moved between the two positions.

Although the receiving and transfer device described and illustrated herein is primarily intended to operate to receive products with the catcher members in closely spaced position and subsequently to discharge the products with increased relative spacings, it will be appreciated that the device may readily be operated, or adapted to operate, whereby products are initially received at a predetermined large relative spacing and then discharged at more closely spaced locations.

Furthermore, while the arrangement described and illustrated herein provides a fixed frame and relatively pivotable catcher members, the device is pivotable and the catcher members remain in a fixed predetermined angular setting.

To this end, the end plates 29 and 30 of the frame can be pivotted to the shaft 31 and a pivot pin 50 (which originally formed part of the pivotal mounting for the ram 39) is keyed to the mounting and a crank 51 is fixed to the pivot pin 50, the crank 51 being of equal length to the crank 42 provided on shaft 31, the catcher members 28 will be maintained in an approximately horizontal position for all angular attitudes of the frame.

I claim:

1. A dough treatment apparatus having a dough divider; an inlet for the supply of dough to said divider; an outlet for the discharge of divided pieces of dough from said dough divider; and a receiver and transfer device arranged to receive the divided pieces of dough from said outlet, and to transfer the pieces to a discharge location; said receiver and transfer device comprising a plurality of catcher members mounted for pivotal movement about an axis between a substantially horizontal receiver position and a discharge position, and being displaceable parallel to said axis between first and second positions, said catcher members being positioned to receive divided pieces of dough from said outlet when said catcher members occupy said substantially horizontal receiver position and said first axial position, and being positioned to discharge divided pieces of dough at the discharge location when the catcher members occupy said discharge position and said second axial position; first drive means coupled with said catcher members to effect axial displacement of said catcher members between said first and second positions, while the catcher members are maintained in said substantially horizontal receiver position; and second drive means, coupled with said catcher members independently of said first drive means, and arranged to effect pivotal movement of the catcher members from said substantially horizontal receiver position to said discharge position only after substantial completion of displacement of the catcher members by said first drive means from said first position to said second position.

2. A dough treatment apparatus according to claim 1, in which said receiver and transfer device is coupled with said dough divider, said device and said dough divider being moveable bodily between an upper position in which dough can be pressed into the divider from said inlet, and a lower position in which dough pieces are ejected from the divider onto said catcher members.

3. A dough treatment apparatus according to claim 2, including a moulding drum arranged at said discharge location to receive dough pieces from said receiver and transfer device.

4. A dough treatment apparatus according to claim 3, in which the axial spacing between individual catcher members is greater in said second position than in said first position.

5. A receiver and transfer device comprising; a plurality of catcher members mounted for pivotal movement about an axis between a substantially horizontal receiver position and a discharge position, said catcher members also being displaceable parallel to said axis between first and second positions to vary the axial spacing between individual catcher members; first drive means coupled with said catcher members to effect axial displacement of said catcher members between said first and second positions, while the catcher members are maintained in said substantially horizontal receiver position; and second drive means, coupled with said catcher members independently of said first drive means, and arranged to effect pivotal movement of the catcher members from said substantially horizontal receiver position to said discharge position only after substantial completion of displacement of the catcher members from said first position to said second position.

6. A device according to claim 1 in which the axial spacing between individual catcher members is greater in said second position than in said first position.

7. A device according to claim 1, in which said catcher members are mounted on a shaft for rotation therewith to pivot between said receiver and discharge positions, said catcher members being displaceable axially of said shaft between said first and second positions.

8. A device according to claim 7, in which said second drive means comprises a lever coupled fast with said shaft, and a ram coupled with said lever to pivot said shaft.

9. A receiver and transfer device comprising; a shaft; a plurality of catcher members mounted on said shaft for pivotal movement between a receiver position and a discharge position, said catcher members also being displaceable parallel to said shaft between first and second positions to vary the axial spacing between individual catcher members; first drive means coupled with said catcher members to effect axial displacement of said catcher members between said first and second positions, said first drive means including a parallelogram linkage coupled with said catcher members, and a ram coupled with said linkage; and second drive means coupled with said catcher members to effect pivotal movement of the catcher members from said receiver position to said discharge position only after substantial completion of displacement of the catcher members by said first drive means from said first position to said second position.

* * * * *